United States Patent [19]

Baker

[11] Patent Number: 4,992,690
[45] Date of Patent: Feb. 12, 1991

[54] COMBINATION MOTOR ENDSHIELD AND PUMP HOUSING

[75] Inventor: Gerald N. Baker, Florissant, Mo.

[73] Assignee: Emerson Electric Co., St. Louis, Mo.

[21] Appl. No.: 255,756

[22] Filed: Oct. 7, 1988

[51] Int. Cl.⁵ .................... H02K 5/10; H02K 15/14; F04D 13/02

[52] U.S. Cl. .................................. 310/89; 310/88; 310/157; 277/67; 277/68; 417/423.11; 417/424.1

[58] Field of Search ............ 277/67, 68; 310/43, 310/88, 89, 90, 112, 157; 417/423.11, 423.7, 424.1, 424.2; 134/186; 29/596

[56] References Cited

U.S. PATENT DOCUMENTS

| | | | |
|---|---|---|---|
| 3,301,188 | 1/1967 | Belonger | 134/186 |
| 3,364,860 | 1/1968 | Matzen | 134/186 |
| 3,425,355 | 2/1969 | La Flame et al. | 134/186 |
| 3,576,380 | 4/1971 | Sargeant | 417/423.11 |
| 3,664,760 | 5/1972 | Reiner | 417/423.11 |
| 3,871,796 | 3/1975 | Mack | 417/423.11 |
| 4,287,662 | 9/1981 | Otto | 310/88 |

Primary Examiner—Peter S. Wong
Assistant Examiner—D. L. Rebsch
Attorney, Agent, or Firm—Polster, Polster and Lucchesi

[57] ABSTRACT

An electric motor for use with a pump has a stator assembly and a rotor assembly. The rotor assembly includes a rotatable shaft and a rotor affixed to and rotatable with the shaft. The stator and rotor assemblies are intended for installation in an appliance. A cover forms an endshield for the motor, as well as a portion of the housing of a pump for the appliance. The cover is constructed so as to align the shaft extending into the pump with operable portions of the pump.

13 Claims, 2 Drawing Sheets

COMBINATION MOTOR ENDSHIELD AND PUMP HOUSING

BACKGROUND OF THE INVENTION

This invention relates dynamoelectric machines such as electric motors used with pumps and, in particular, an improvement comprising a cover forming both an endshield for the motor and a portion of the pump housing. While described in particular with respect to such application, those skilled in the art will recognize the wider application of the invention disclosed hereinafter.

A typical use for a dynamoelectric machine such as electric motor is with a pump, for example, in dishwashers, swimming pools, and spas. Certain problems arise when a motor is used in these types of applications. These problems can arise, for example, from the proximity of the motor to the pump. Water in the form of condensation is particularly troublesome. Generally, the applications described are high humidity environments for the motor. Temperature changes, caused by a number of factors, can cause condensation. The condensate tends to form on the inside of the motor, creating potential electrical shorting problems. The presence of water also can cause corrosion, particularly where the endshield of the motor housing is made of a metal such as aluminum. Leakage between the pump and motor is another problem area. Motor and pump combinations often use expensive and/or complicated structures to prevent water migration from the pump to the motor. Over time, the seals between the motor and the pump will tend to leak, allowing water to reach the motor. The presence of water will damage the motor bearings, reducing motor life. Further complications arise because of misalignment between the motor and the pump. Any misalignment amplifies the water leakage-water migration problem of the motor and pump combination. All of these problems tend to reduce motor life or pump life, or both, necessitating expensive repair or replacement of the motor or the pump.

SUMMARY OF THE INVENTION

Among the several objects of the present invention may be noted the improvement to a dynamoelectric machine such as an electric motor used in conjunction with a pump; the provision of such improvement to be a cover forming both an endshield for the motor and a portion of the pump housing; the provision of such cover to facilitate alignment of a motor shaft with operable portions of the pump, thus to reduce wear and prolong the useful life of both the motor and the pump; the provision of such improvement to reduce exposure of the motor components to condensation, or other water damage from leaking seals; the provision of such a cover to be formed of a reinforced thermoset polyester material which insulates the motor from either low temperature or high temperature problems; the provision of such material to be inert; and the provision of such cover to be a molded component manufacturable at low cost and with high dimensional tolerances.

In accordance with this invention, generally stated, a dynamoelectric machine is specifically designed for use with a pump. The machine has a stator assembly, and a rotor assembly including a rotatable shaft and a rotor affixed to and rotatable with the shaft. An endshield rotatably supports the shaft on one end of the shaft. An improvement comprises cover means forming both an endshield for the motor and a portion of a housing for any associated pump. The cover means includes a second support for rotatably supporting the shaft and means for aligning the shaft with operable portions of the pump. Other objects and features will be in part apparent and in part pointed out hereinafter.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 1:
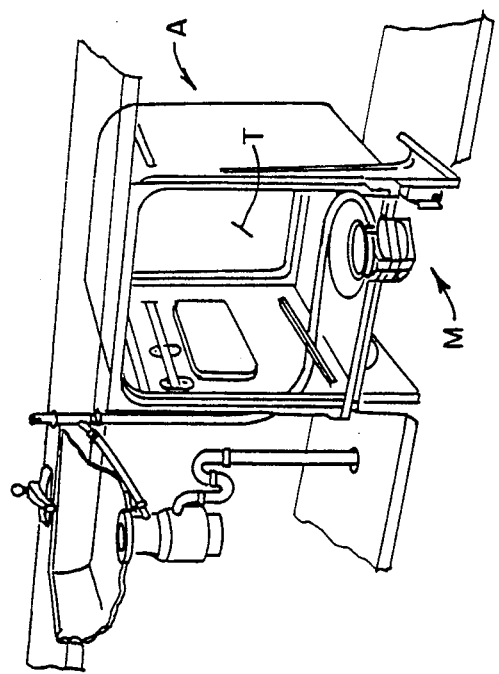
FIG. 1 is a front elevational view of an appliance, such as a dishwasher, with the front cover removed and illustrating the installation of a motor with the improvement of the present invention.

Referring to the drawings, a dynamoelectric machine or electric motor M is for use with a pump P. Only portions of the pump P are illustrated for drawing simplicity. The general mechanical features of the pump, except as disclosed herein, are conventional. As shown in FIG. 1, the motor and pump are used in an appliance A, for example, a dishwasher. Motor M is used to drive pump P and for this purpose, the motor is installed in a vertical position in the bottom of the appliance below an area T in which dishes or other household items are placed for washing. The pump has a water drain D, for discharging water from the appliance A in a conventional manner. The design, construction, and operation of appliance A itself, other than as disclosed herein, forms no part of the present invention. As indicated, the invention finds application in any suitable pump and motor combination.

Figure 3:
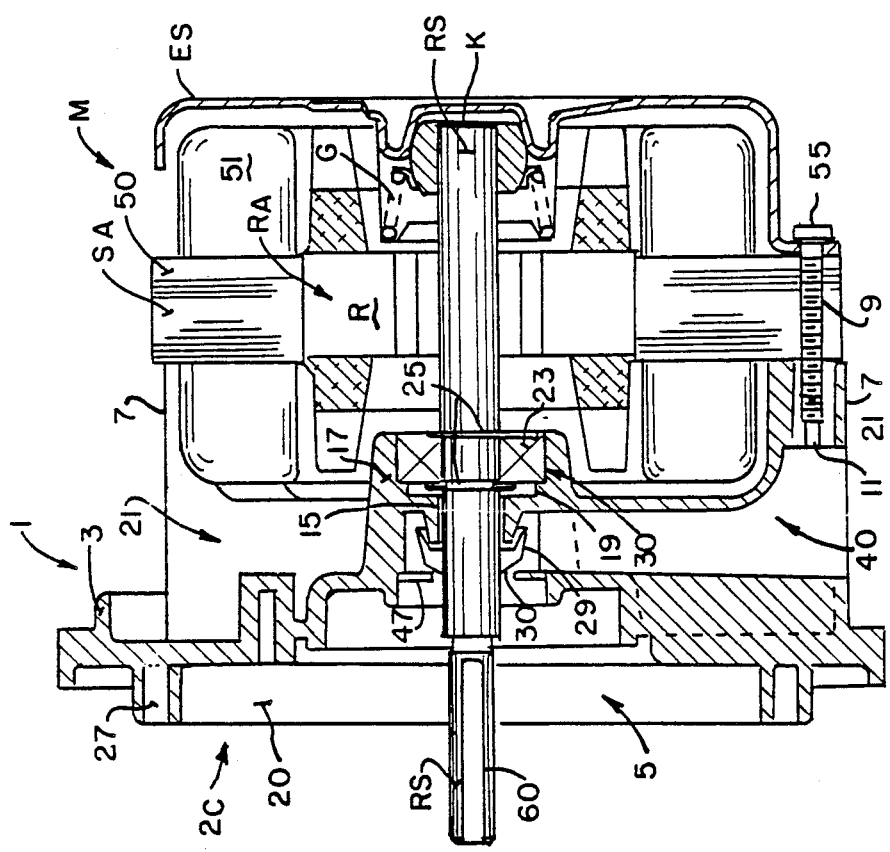

Referring to FIG. 3, motor M has a stator assembly SA and a rotor assembly RA. Rotor assembly RA includes a rotatable shaft RS and a rotor R affixed to and rotatable with the shaft RS. The stator and rotor assemblies are mounted in between an endshield ES at one end, and an endshield means 1, later described, on the other end of motor M.

The endshield ES has a centrally formed bearing assembly K and one end of shaft RS and a bearing B in which the end of the shaft RS is journaled are positioned in the bearing B assembly K. The bearing is spring loaded or held in place by a spring G in a conventional manner. Various construction techniques may be employed with the motor. In the embodiment illustrated, the shaft RS is journaled for rotation along the endshield ES by a self-aligning bearing B. The stator assembly SA is conventional, and includes a core 50 constructed from suitable magnetic material. The core 50 has a plurality of winding receiving slots (not shown) formed in it and a plurality of windings 51 are contained in the slots. The endshield ES is attached to the core 50 by threaded fasteners 55, in a conventional manner. While no particular enclosure is employed in the motor M, other conventional constructions including those where the stator and rotor assemblies are mounted in a shell or housing are compatible with the broader aspects of the present invention.

An improvement of the present invention comprises a cover means 1 forming an endshield 3 for the motor M, on one side of a cover 1 and a portion of the housing for pump P on the other side thereof. Cover means 1 is formed of a reinforced thermoset polyester material capable of withstanding both high and low temperature variations. This allows the motor to withstand the extremes of the operating environment within appliance A.

Figure 2:
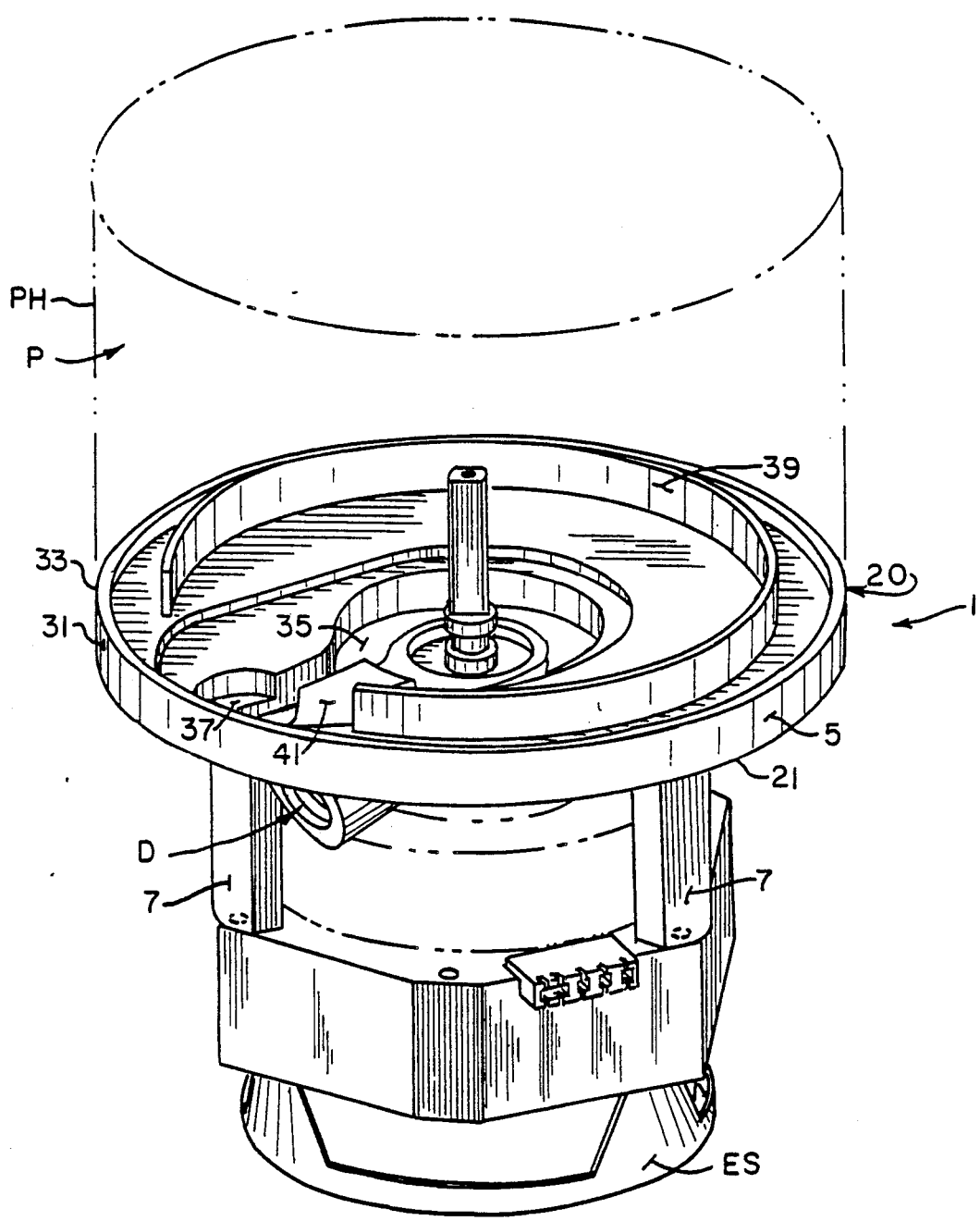
FIG. 2 is a perspective view of the motor with the cover of the present invention installed; and, FIG. 3 is a sectional view of the motor showing the cover of the present invention installed.

As particularly shown in FIG. 2, means 1 includes a base section 5, having a side 20, delimiting a portion of the pump P, and a side 21, delimiting the endshield 3 for the motor M. Cover means 1 includes a plurality of legs 7 (two of which are shown in FIG. 2) which rest against a portion of stator core 50. As shown in FIGS. 2 and 3, longitudinal stator bolt openings 9 are formed about the perimeter of the stator core 50, and the legs 7 have threaded bores 11 which register with the stator bolt openings 9 when means 1 is installed over the second end of the motor M. Bolts 55 (one of which is shown in FIG. 3) are inserted through opening 9 and threaded into legs 11 to secure cover means 1 to the motor. Those skilled in the art will recognize that other means for attaching the components are contemplated to the present invention. Thus, the endshields ES and 3 may be attached to the stator assembly RA by epoxy or other adhesives, for example.

Base section 5 has a central opening 15 through which shaft RS extends. The base section 5 further has a bearing receptacle 17 extending toward the stator assembly RA of motor M on the side 21 of the endshield 3. Receptacle 17, in the embodiment illustrated, is generally cylindrical in shape, with the centerline of the receptacle corresponding to the centerline of opening 15. A smaller diameter shoulder 19 is formed adjacent opening 15, shoulder 19 forming a step. Means 1 includes a bearing assembly 30 for rotatably supporting shaft RS on the endshield side 3 of the motor M. The bearing assembly 30 includes a bearing 23, the leftward end of which, referred to in FIG. 3, rests against shoulder 19. A pair of washers 25 are insertable on shaft RS to hold bearing 23 in place. In the preferred embodiment, bearing 23 is a conventional roller bearing for positioning the shaft RS for rotation.

Means 1 includes mounting means 27 for attaching the cover means 1 to the pump P. The shaft RS also is provided with a flat 60 for attaching the shaft RS to the pump P. For drawing clarity, the operable portions of pump P are not shown. A water seal 30 is mounted to the shaft RS, the seal 30 includes an outwardly projecting collar 29 formed about opening 15. Collar 29 is formed on the opposite side of opening 15 from shoulder 17 and the collar extends around the circumference of the opening. An important feature of the present invention is the inclusion in cover means 1 of a migrating water drain 40 in the side 21 of the cover means 1. The drain 40 is a communication path formed in the side 21 of the cover means with communication with the area about the seal 30. Water migrating along the shaft RS, for example, is slung from the shaft by the operation of the seal 30. That water is conveyed from the remainder of the motor M structure by the drain 40. Consequently, an efficient and low cost structure is provided for keeping the motor M structure free of water attempting to enter the motor structure along the shaft RS. A wall 47 may be provided, as shown in FIG. 3, as an aid in supporting a rotating face seal (not shown) commonly used in pump designs.

In addition to the base section, means 1 further includes an outer section 31 having an outer circumferential rim 33 defining a mating surface with pump housing PH, best seen in FIG. 2. Further, section 31 has a central cavity 35 defining a drain 37 for liquid discharged through pump P. An upstanding wall 39 is formed inwardly of rim 33, the wall extending substantially around the circumference of section 31. Wall 39 and rim 33 define a channel 41 communicating with a drain D which is formed on the side 21 of the endshield 3.

As thus described, a simplified structure is provided in which one endshield of the motor M also is an integral part of the pump P in which the motor M finds application. Use of the self-aligning bearing on the endshield ES side of the rotor assures proper alignment of the shaft RS in applicational use. This also occurs because endshield 3 is a part of the pump P, and the dual function cover means 1 can be mounted easily and quickly in its intended application.

Numerous variations, within the scope of the appended claims, will occur to those skilled in the art in light of the foregoing description and accompanying drawings. Thus, while certain materials were described as preferred, other materials may be substituted. Various dimensions of the components may change. For example, the length of the legs 7 may vary in use from application to application, or between motor ratings in a specific application. While the motor M has been described as an induction motor, other motor types, including brushless permanent magnet motors may be used, if desired. The shape of cover means 1 may be altered to make it compatible with other pumps or application designs. These variations are merely illustrative.

Having thus described the invention, what is claimed and desired to be secured by Letters Patent is:

1. In a dynamoelectric machine for use with a pump or the like, the machine having a stator assembly a rotor assembly including a rotatable shaft and a rotor mounted to and rotatable with the shaft, a first endshield for rotatably supporting the shaft, the improvement comprising cover means defining a second endshield for the machine for rotatably supporting the shaft on a first side at a point intermediate the length of the shaft, the cover means defining a portion of a housing for the pump on a second side thereof, said shaft extending beyond the cover means into the operable portions of the pump and said cover means including means for aligning the shaft with operable portions of the pump, and said cover means having an outer section with an outer circumferential rim defining a mating surface with a pump housing, and a central cavity defining a drain for liquid discharged through the pump, and an upstanding wall formed inwardly of the rim and extending substantially around the circumference of the outer section, the wall and the rim defining a channel communicating with said drain.

2. The improvement of claim 1 wherein the cover means includes a plurality of legs abutting the stator assembly, including means for attaching said legs to said stator assembly.

3. The improvement of claim 2 wherein the first endshield and the cover means are interconnected along said stator assembly.

4. The improvement of claim 3 wherein the cover means has a base section with a central opening therein sized to accommodate the shaft, and seal means at least partially mounted to said shaft for sealing said motor from liquid migrating along said shaft.

5. The improvement of claim 4 further including bearing means for journaling the shaft along said cover means.

6. The improvement of claim 5 wherein the base section includes a bearing receptacle integrally formed with it, and the bearing means includes a bearing installed within the said receptacle, the shaft being journaled in the bearing.

7. The improvement of claim 1 wherein the cover means is formed by a reinforced thermoset polyester material.

8. A dynamoelectric machine, comprising a stator assembly including a stator core, having a bore opening therethrough;
   a rotor assembly including a rotor positioned in the bore opening, and a shaft;
   a first endshield means including a bearing assembly for rotatably supporting said shaft along a first and end portion thereof;
   second means for supporting said shaft along a second and intermediate portion thereof, said second means having a first side and a second side, the first side defining said support for said second portion of said shaft along the first side, and a portion of a pump housing being formed along the second side thereof; and,
   cover means having an outer section with an outer circumferential rim defining a mating surface with a pump housing, and a central cavity defining a drain for liquid discharged through the pump, and an upstanding wall formed inwardly of the rim and extending substantially around the circumference of the outer section, the wall and the rim defining a channel communicating with said drain.

9. The dynamoelectric machine of claim 8 further including a water seal mounted to said shaft on the first side of said second supporting means, and water drain means formed on said second side of said supporting means, communicating with said seal, for receiving water migrating along said shaft from said shaft form said dynamoelectric machine.

10. The dynamoelectric machine of claim 9 wherein said first endshield means and said second means for supporting are interconnected to one another.

11. The dynamoelectric machine of claim 10 wherein said second supporting means is constructed from a reinforced thermoset polyester material.

12. The dynamoelectric machine of claim 11 wherein said second supporting means further includes a central cavity in the second side thereof defining a pump drain for discharge of liquid through a pump.

13. A combination pump cover/motor endshield for use with a pump, the motor having a stator assembly, a rotor assembly including a rotatable shaft and a rotor mounted to and rotatable with the shaft, and an endshield rotatably supporting one end of the shaft, the combination comprising cover means which on one side defines a second motor endshield which rotatably supports the shaft at a point intermediate its length and which on its other side defines a portion of a housing for the pump, said cover means including means for aligning the shaft with operable portions of the pump, a plurality of legs abutting the stator assembly, means for attaching said legs to said stator assembly whereby the first said endshield and the cover means are interconnected along said stator assembly, a base section having a central opening therein sized to accommodate the shaft, and seal means at least partially mounted to said shaft to seal said motor from liquid migrating along said shaft,
   the cover means further including an outer section having an outer circumferential rim defining a mating surface with a pump housing, a central cavity defining a drain for liquid discharged through the pump, an upstanding wall formed inwardly of the rim and extending substantially around the circumference of the outer section, the wall and the rim defining a channel communicating with said drain, and bearing means for journalling the shaft at said intermediate point along its length, said base section having a bearing receptacle integrally formed with it, and the bearing means including a bearing installed within said receptacle, the shaft being journalled in the bearing.

* * * * *